United States Patent [19]

Sorensen

[11] Patent Number: 4,467,994
[45] Date of Patent: Aug. 28, 1984

[54] CORE CENTERED MOLD FOR HOLLOW STACKABLE PLASTIC PRODUCTS

[76] Inventor: Jens O. Sorensen, P.O. Box 2274, Rancho Santa Fe, Calif. 92067

[21] Appl. No.: 424,493

[22] Filed: Sep. 27, 1982

[51] Int. Cl.³ .......................... B29C 1/14; B29F 1/022
[52] U.S. Cl. .................................... 249/144; 425/577
[58] Field of Search .................. 264/328.12; 249/144, 249/151, 142; 425/542, 577

[56] References Cited

U.S. PATENT DOCUMENTS

| | | |
|---|---|---|
| 2,434,594 | 1/1948 | Schultz . |
| 3,375,554 | 4/1968 | Blumer . |
| 3,397,266 | 8/1968 | Ayres ............................ 264/328.12 |
| 3,995,008 | 11/1976 | Spiegelberg .................... 249/109 X |
| 4,165,062 | 8/1979 | Mitchell ............................ 249/142 |
| 4,264,295 | 4/1981 | Hingley ............................... 425/577 |

FOREIGN PATENT DOCUMENTS 17577 1/1972 Australia .
962726 6/1950 France .

OTHER PUBLICATIONS

Kunststoffe, vol. 51, No. 10, 1961, München, H. Giastrov, "Spritzgusswerkzeug für Tablettenröhrchen".

Primary Examiner—Willard E. Hoag
Attorney, Agent, or Firm—Brown & Martin

[57] ABSTRACT

A mold which comprises a number of circumferential throttles, at least partly located on the sides of the cavity and core parts respectively. The throttle distance is significantly shorter than the adjacent wall thickness, the pitch between throttles is such that stacking of the molded product is possible. The mold may comprise a number of feed channels leading from one throttle to the next throttle. The mold differs among other factors from the prior art by its short throttle distance, by its flow channels, by the throttles being located on the sides of the products, and the number of throttles being more than one. The throttles improve the rigidity of the molded thin-walled hollow product. When the molded product is a hand-held venting cup the throttles prevent burning of the fingers.

8 Claims, 7 Drawing Figures

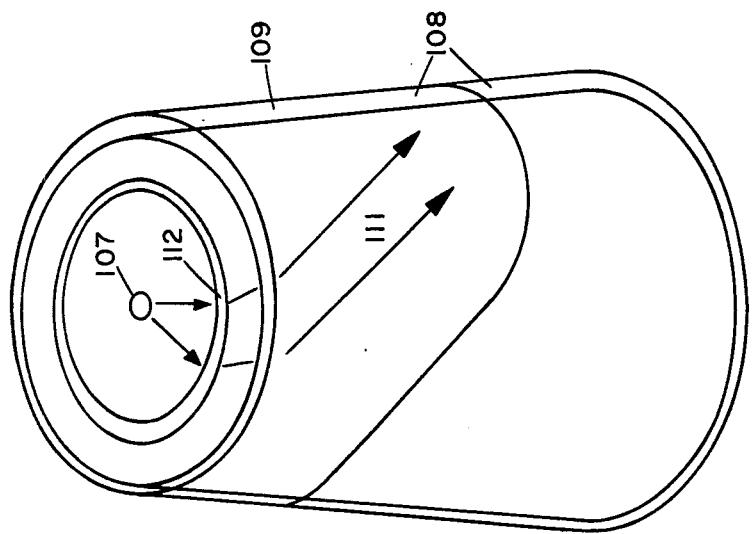
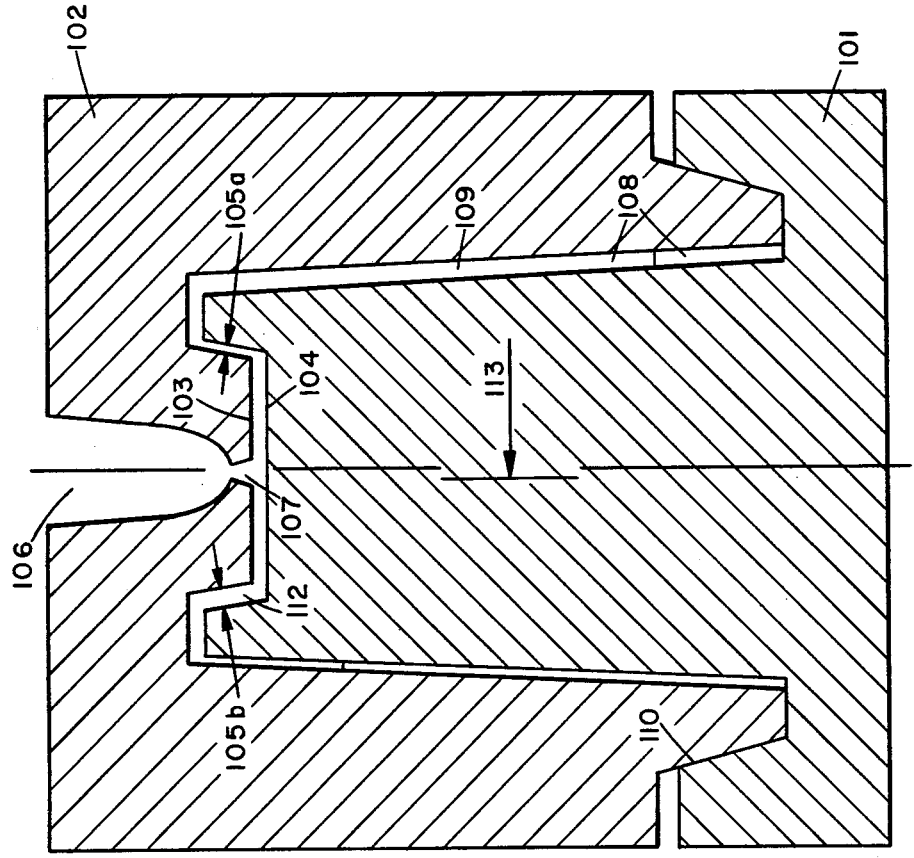
FIG. 1B PRIOR ART
FIG. 1A PRIOR ART

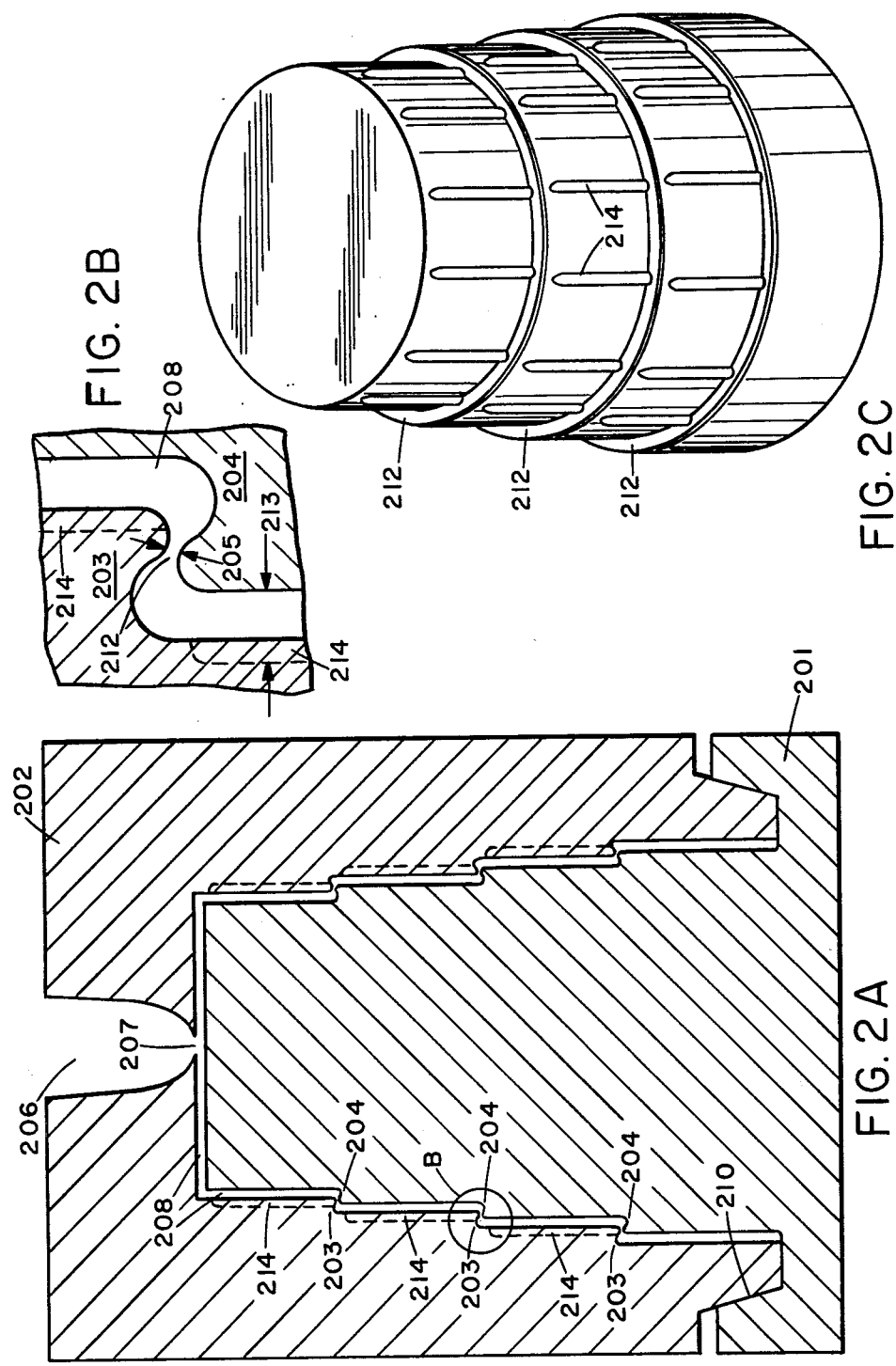

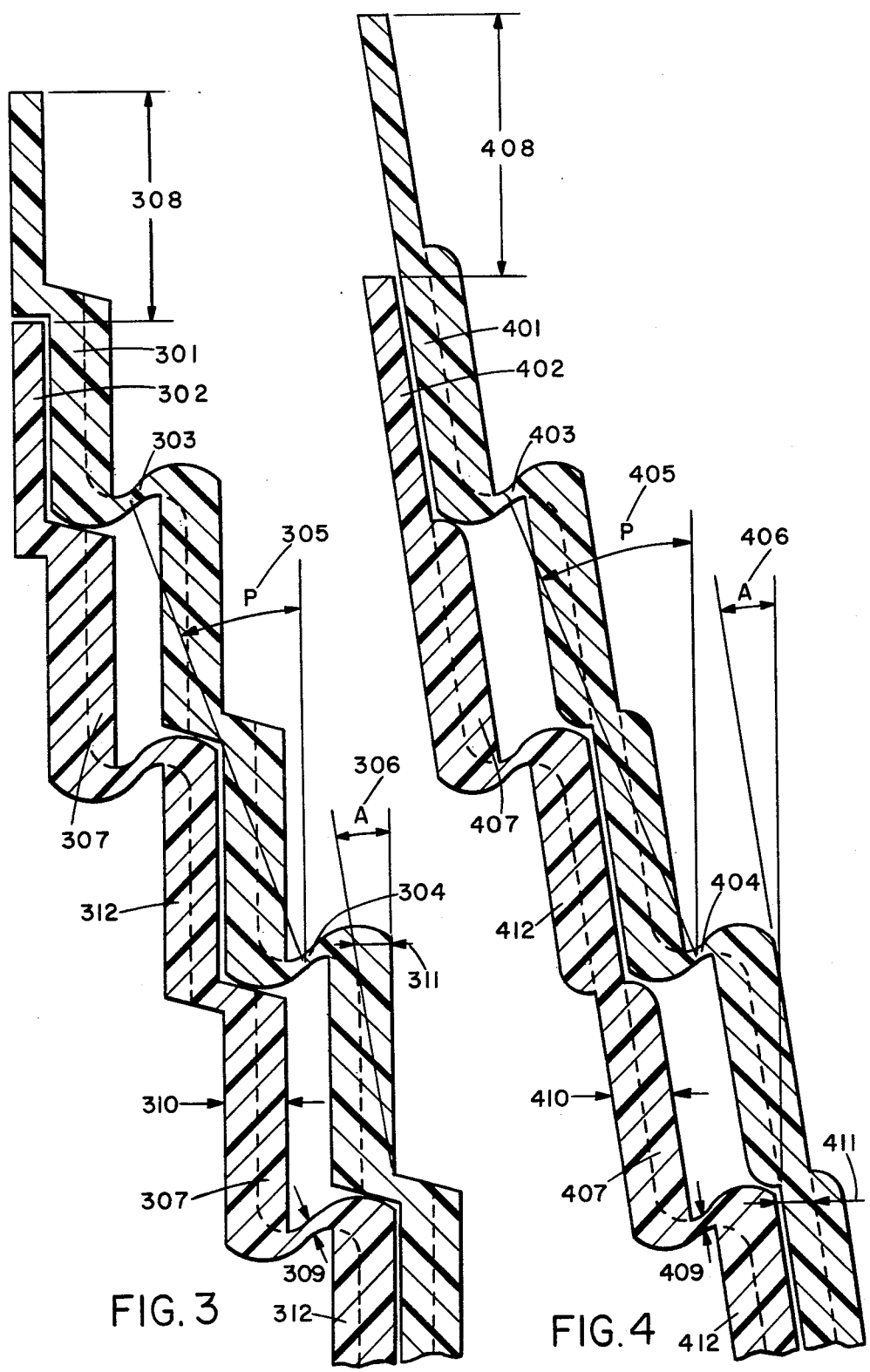

CORE CENTERED MOLD FOR HOLLOW STACKABLE PLASTIC PRODUCTS

FIELD OF INVENTION

This invention generally relates to injection molding of hollow stackable plastic products and is particularly directed to centering the core of the mold. The core is the mold part which forms the interior of a concave or hollow molded product.

CROSS REFERENCE TO RELATED APPLICATION

The invention is cross referenced to U.S. patent application Ser. No. 230,302, now U.S. Pat. No. 4,381,275, entitled STABILIZED CORE INJECTION MOLDING OF PLASTIC and United Kingdom Patent Application No. 8,221,909 entitled STABILIZED CORE INJECTION MOLDING, both applications which are different are by the inventor of the present application.

DISCUSSION OF PRIOR ART

Heretofore, it has been a great problem to center the cores of molds used for injection molding of hollow stackable products of plastic with thin walls such as venting cups, yogurt containers, margarine containers and flower pots. In order to injection mold such products a very large injection pressure is necessary which causes the core part of the mold to move in relation to the cavity part of the mold, resulting in molded products which do not have even wall thickness.

Until now no practical solution has been found to the problem and therefore such products are generally produced with a wall thickness which is larger than necessary for the purposes of the product. With the larger wall thickness lower injection pressure is sufficient for filling the mold, and therefore less strain is put on the core part of the mold, with resulting more evenly distributed wall thickness.

Many unsuccessful attempts have been made to solve the problem of core centering, for example U.S. Pat. No. 4,264,245 to Hingley; and U.S. Pat. No. 3,375,554 to Blumer, which is the closest prior art to the present invention, a description of the mold disclosed by Blumer and the reason that it is not successful is illustrated in the drawings and their description.

SUMMARY OF THE INVENTION

A mold for injection molding of thin-walled, hollow, stackable plastic products, comprising a core part and a cavity part, where the relative reciprocal wall thickness of the molded product may be equalized by centering the core part in the cavity part during injection.

The core part and the cavity part each have an axially extending circumferential recess in a circumferential shoulder. Each such recess limits an axially extending annular projection (ridge). Corresponding such annular projections located on the sides of the core part and the cavity part respectively in combination define a core-centering circumferential throttle. The minimum distance from the ridge of the core part to the corresponding ridge of the cavity part is called the throttle distance, when the core part is centered in the cavity part the throttle distance of the invention is significantly shorter than the adjacent wall thickness. For purposes of stacking the molded hollow products the angle of the pitch between the throttles is larger than arcus tangent of the basic horizontally measured wall thickness between the throttles divided by the stacking height of the molded product. The circumferential ridges on the side of the core and cavity part of the mold shape the circumferential ridges on the hollow stackable molded product, these ridges help to make the hollow product rigid. When the hollow product is, for example, a hand-held venting cup for hot drinks, the circumferential ridges provide a reduced area of contact between cup and fingers, resulting in less heat transfer and prevent possible burning of the fingers. There may conveniently be about ten to twenty circumferential ridges on the molded product, not all of these ridges need to be throttled with a throttle distance which is significantly shorter than the adjacent wall thickness, in one embodiment only every other circumferential ridge is throttled and the throttles which are nearer the apex of the hollow product have shorter throttle distances than the throttles which are closer to the open end of the hollow product.

In order to ease the filling of the cavity for injection molding of the thin-walled hollow product, a number of feed channels may be provided in the core and/or cavity part of the mold leading in a direction from the apex towards the open end of the hollow product. In order to get the best core centering, it is important that the throttle distance, particularly of the throttles near the apex end of the hollow product, is small in relation to the adjacent wall thickness where molten plastic is flowing during the filling. During the filling step, a large proportion of the injected plastic will flow in the above mentioned feed channels, and therefore the throttle distance in relation to the wall thickness of the feed channels is particularly small, thereby greatly improving the core centering process.

Further objects and advantages of the invention will become apparent from a consideration of the drawings and subsequent description thereof.

BRIEF DESCRIPTION OF THE DRAWINGS

FIG. 1A illustrates a sectional view of a prior art mold for injection molding of hollow stackable plastic products.

FIG. 1B illustrates a perspective view of the cavity part of the mold of FIG. 1A.

FIG. 2A illustrates a sectional view of a mold according to a preferred embodiment of the invention.

FIG. 2B illustrates an enlarged sectional view of a throttle located in the circled area marked B of FIG. 2A.

FIG. 2C illustrates a perspective view of a hollow stackable plastic product as produced in the mold of FIG. 2A.

FIG. 3 shows a partial sectional view of two hollow stackable plastic products in their stacked position as produced by a mold of a preferred embodiment of the invention.

FIG. 4 shows a partial sectional view of two hollow stackable plastic products in their stacked position as produced by a mold of another preferred embodiment of the invention.

DESCRIPTION OF THE ILLUSTRATED PRIOR ART

FIG. 1A shows a prior art mold comprising a core part 101 and a cavity part 102 for injection molding a thin-walled, hollow, stackable plastic product. The cavity part 102 comprises a circumferential protuberance 103 which projects into a circumferential depression 104 of the apex of the core part 101. The protuberance 103 and the depression 104 in combination provide a circumferential throttle 112 with a throttle distance 105a and 105b which at an average corresponds to the wall thickness of the molded product to be produced. The mold 101, 102 comprises a runner 106 and a gate 107 which connects the runner 106 with the cavity 108. A partly filled product 109 is shown in the cavity 108. Near the open end of the cavity part 102 is a conical flange 110 which centers the core part 101 with the cavity part 102 of the mold when the mold is closed, and before plastic is injected.

FIG. 1B shows a perspective view of the cavity 108.

The operation of the prior art embodiment depicted in FIGS. 1A and 1B is as follows: molten plastic enters from the runner 106 through the gate 107 into the cavity 108. The molten plastic will from practical experience flow further down the side of the core than the other, in this case the side down which the molten plastic has flown the furthest is depicted as the right side. The pressure of the molten plastic on the right side of the core part 101 causes a force on the core part 101 in a left going direction which is greater than the force in a right going direction caused by the pressure of the molten plastic on the left side of the core part 101, and therefore the core is forced to the left, as shown by the arrow 113. Both the forces and movement as described above are in relation to the cavity part 102. The two opposing forces are proportional to the product of the pressure and the projected area; both average pressure and area is greater on the right side of the core part 101, and therefore the force is also greater on the right side of the core. In the absence of the circumferential throttle 112, most of the molten plastic would continue to flow down the right side of the cavity 108, thereby further moving the core part 101 to the left, in a vicious circle of off-centering the core part 101 in the cavity part 102 of the mold. But in the case depicted in FIG. 1A, the action of the core part 101 moving to the left will cause the right side of the circumferential throttle 112 to close up and the left side of the throttle 112 to open up, resulting in the flow down the right side of the cavity 108 being impeded and the flow down the left side of the cavity 108 being enhanced, thereby to a certain extent breaking the vicious circle. Unfortunately, practical experience shows that the above described prior art system is unsuccessful. The reason will become apparent from a description of the operation of the perspective view of the cavity in FIG. 1B. The flow of molten plastic to the right and to the left has already been described; we shall not look at the flow of molten plastic which flows in a direction towards the observer.

The molten plastic flows from the gate 107 to the circumferential throttle 112. At the right the throttle 112 is quite closed up and at the left the throttle 112 is quite opened up, but in a direction towards the observer the throttle 112 is at a wall thickness which corresponds to that of the molded product to be produced. The molten plastic therefore flows through the throttle 112 and continues in the direction of greater cavity thickness. Down the left side of the cavity 108 the thickness is decreased due to the core part 101 moving to the left, down the front side of the cavity 108 the thickness is that of the product to be produced, but down the right side the cavity thickness is increased due to the core part 101 moving to the left; the molten plastic therefore moves down in a right direction as depicted by the arrows 111. Unfortunately, this flow bypasses the closed up side of the circumferential throttle 105B, and the advantages of the core centering process are very small indeed.

DESCRIPTION OF THE PREFERRED EMBODIMENTS

FIG. 2A shows a mold of a preferred embodiment of the invention. The mold comprises a core part 201 and a cavity part 202 for injection molding a thin-walled, hollow, stackable plastic product. The side of the cavity part 202 comprises several circumferential ridges 203 and the side of the core part 201 comprises an equal number of circumferential ridges 204. Each ridge 203 of the cavity part 202 corresponds to a ridge 204 of the core part 201. Each corresponding pair of circumferential ridges provides a self-centering circumferential throttle 212 for the injection of plastic. The minimum distance from the ridge of the core part 204 to the corresponding ridge of the cavity part is called the throttle distance 205, seen best on FIG. 2B; the throttle distance 205 is significantly shorter than the adjacent wall thickness 213. The mold 201, 202 also comprise a runner 206 and a gate 207 which connects the runner 206 with the cavity 208. Near the open end of the cavity part 218 is a conical flange 210 which centers the core part 201 with the cavity part 202 of the mold, when the mold is closed and before plastic is injected. FIG. 2C shows a molded product of the mold of FIG. 2A, in order to ease the filling of the cavity 208 a number of feed channels 214 are provided in the cavity part of the mold, leading in a direction from the apex towards the open end of the molded product.

The operation of the preferred embodiment depicted in FIGS. 2A, 2B and 2C is as follows: molten plastic enters from the runner 206 through the gate 207 into the cavity 208. The molten plastic will from practical experience flow further down one side of the core part 201 than the other, for example the right side, thereby forcing the core slightly to the left, thereby slightly closing the circumferential throttle 212 on the right side, and slightly opening the circumferential throttle 212 on the left side.

Since the throttle distance 205 is significantly shorter than the adjacent wall thickness 213, and since the circumferential throttle distance is shorter on the right side than on the left side of the cavity 208, the molten plastic will have a tendency to fill mainly the left side of the cavity 208. Although 100% core centering is not achieved at this stage, and the flow of molten plastic is still faster on the right side of the core 201 than the left side of the core 201, the flowing molten plastic will soon meet a new circumferential throttle 212 which is slightly more closed on the right side than the left side, so that the molten plastic will have an additional tendency to fill up mainly the left side of the cavity 208. The next circumferential throttle 212 will have the same tendency and so on until almost 100% core centering is achieved.

The four most important factors that the mold of the invention is successful in relation to the prior art are: (a) that the throttle distance is significantly shorter than the adjacent wall thickness of the molded product, particularly in the circumferential throttles which are nearest to the gate 207; (b) that because of the feed channels 214, the relation of the throttle distance to the adjacent wall thickness is further decreased; (c) the distance from the gate to each circumferential throttle, which is positioned on the side of the core and cavity parts respectively, is greater than in the prior art, making shortcuts to the flow of the molten plastic more difficult; and (d) there are a number of circumferential throttles instead of only one.

FIG. 3 shows a partial sectional view of two thin-walled, hollow, stackable plastic products in their stacked position, molded by a mold of the invention of a slightly modified embodiment than that depicted in FIGS. 2A, 2B and 2C. Shown is an upper product 301 and a lower product 302 separated by the stacking height 308. Shown is also a first circumferential throttle 303 and a second circumferential throttle 304 of the upper product 301. The throttle distance 309 which is the minimum distance from the ridge of the core part to the corresponding ridge of the cavity part, of the production mold of the product, is significantly shorter than the adjacent wall thickness 310. The angle of the pitch 305 from the first throttle 303 to the second throttle 304 is larger than arcus tangent 306 of the basic horizontally measured wall thickness 311 between the throttles 303 and 304 divided by the stacking height 308 of the molded product.

Between the throttles are a number of feed channels 307, 312 leading from throttle to throttle 304, 303, etc. A part of the feed channels 307 project towards the center axis of the molded product 301, 302 and another part of the feed channels 312 projects away from the center axis of the molded product 301, 302. The molded product 301, 302 and therefore also its production mold comprise a number of circumferential ridges which are separated by a distance which is equal to the stacking height 308 of the molded product 301, 302.

FIG. 4 shows a partial sectional view of two thin-walled, hollow, stackable plastic products in their stacked position molded by a mold of the invention of a slightly modified embodiment than that depicted in FIG. 2 or 3. Shown is an upper product 401 and a lower product 402 separated by the stacking height 408. Shown is also a first circumferential throttle 403 and a second circumferential throttle 404 of the upper product 401. The throttle distance 409, which is the minimum distance from the ridge of the core part to the corresponding ridge of the cavity part, of the production mold of the product, is significantly shorter than the adjacent wall thickness 410. The angle of the pitch 405 from the first throttle 403 to the second throttle 404 is larger than arcus tangent 406 of the basic horizontally measured wall thickness 411, between the throttles 403 and 404 divided by the stacking height 408 of the molded product. Between the throttles are a number of feed channels 407, 412 leading from throttle to throttle 404, 403, etc. A part of the feed channels 407 project towards the center axis of the molded product 401, 402 and another part of the feed channels 412 projects away from the center axis of the molded product 401, 402. The molded product 401, 402 and therefore also its production mold comprise a number of circumferential ridges which are separated by a distance which is approximately equal to two times the stacking height 408 of the molded product 401, 402.

While the above description contains many specificities, these should not be construed as limitations on the scope of the invention, but rather as an exemplification of one preferred embodiment thereof. Many other variations are possible, for example molds which have no flow channels or molds for producing products with a square circumference, or products with rounded cross-sectionally shaped sides. Accordingly, the scope of the invention should be determined not by the embodiments illustrated, but by the appended claims and their legal equivalents.

I claim:

1. A mold for injection molding of thin-walled, hollow, stackable plastic products, comprising a core part and a cavity part, where the relative reciprocal wall thickness of the molded product may be equalized by centering the core part in the cavity part during injection; the core part and the cavity part each having an axially extending circumferential recess in a circumferential shoulder, each said recess limiting an axially extending annular projection, corresponding such projections located on the sides of the core part and the cavity part respectively in combination defining a core-centering circumferential throttle.

2. A mold according to claim 1, wherein the throttle distance, which is the minimum distance from the annular projection of the core part to the corresponding annular projection of the cavity part, is shorter in the circumferential throttles which are placed nearer to the gate of the mold.

3. A mold according to claim 1, comprising a plurality of circumferential annular projections which are located on the side of the core and cavity parts respectively and which in combination provide a series of spaced self-centering circumferential throttles.

4. A mold according to claim 3, wherein the core part and cavity part in combination define a plurality of spaced feed channels extending between adjacent throttles, wherein the feed channel wall thickness is greater than the average wall thickness of the molded product.

5. A mold according to claim 4, wherein the feed channels uniformly consist of first and second serial parts that respectively radially project in opposite directions.

6. A mold according to claim 3, wherein the plurality of circumferential annular projections are separated by a distance which is approximately equal to two times the stacking height of the molded product.

7. A mold according to claim 6, wherein the core part and cavity part in combination define a plurality of spaced feed channels extending between adjacent throttles, wherein the feed channel wall thickness is greater than the average wall thickness of the molded product.

8. A mold according to claim 7, wherein the feed channels uniformly consist of first and second serial parts that respectively radially project in opposite directions.

* * * * *